United States Patent Office 2,930,317
Patented Mar. 29, 1960

2,930,317

PLANOGRAPHIC PRINTING PLATE PROVIDED WITH A METHYLOLATED POLYACRYLAMIDE COATING AND PROCESS OF MAKING

Glenn Harold Perkins, Mexico, Maine, assignor to Oxford Paper Company, Rumford, Maine, a corporation of Maine No Drawing. Application December 19, 1956
Serial No. 629,241

6 Claims. (Cl. 101—149.2)

This invention relates to coating compositions useful in making planographic printing plates. The invention includes, in addition to the improved coating compositions, improved printing plates embodying the coating compositions of this invention and to the method of making the same. More particularly, the invention relates to a coating composition comprising a pigment and a methylolated polyacrylamide and to printing plates formed by coating the composition onto a suitable base, and cross-linking the methylolated polyacrylamide to form an insoluble coating thereon having the proper hydrophilic-oleophilic balance.

Offset or planographic printing plates are used to reproduce images which have been applied to the planographic surface of the plate. The image is oleophilic in nature in that it attracts oily or greasy substances and is essentially water repellent. The unimaged portion of the planographic surface is hydrophilic to the extent that it can easily be wet by water but also be able, before wetting, to accept and hold an oily or greasy image. Planographic surfaces must have this hydrophilic-oleophilic balance so that the oily or greasy image can be applied thereto and the unimaged area wet by water. The planographic surface thus prepared and imaged is subjected to treatment by an etch solution which prepares the plate for printing. The etch solution is repelled by the image portion of the plate but is attracted by the unimaged area. The unimaged area, therefore, is covered by a surface film of the etch solution leaving the image portion alone ink receptive.

A planographic printing plate thus prepared can operate on an offset printing press whereby the plate is alternately contacted by a roll supplying water and a roll supplying ink. After the image has been inked it is transferred from the plate to a rubber blanket and from the blanket to the copy paper.

The printing plates produced according to this invention have properties superior to other known planographic printing plates as well as advantages in the process of forming the printing plates. Planographic surfaces prepared employing methylolated polyacrylamide as an adhesive as herein disclosed produce clean copy, good toning, and possess good image and correction life, and "stop-go" properties. The methylolated polyacrylamide is also advantageous since the cross-linking resin necessary for insolublizing the planographic coating and the colloid needed to obtain the proper hydrophilic-oleophilic balance for a planographic surface are one and the same. In addition, the printing plates can be produced according to this invention by one coating machine pass.

Broadly, the invention consists of forming an aqueous coating composition comprising a methylolated polyacrylamide together with a pigment. This aqueous coating composition is then applied in a conventional manner to the surface desired and the coating heated in the presence of a catalyst to effect a cross-linking of the methylolated polyacrylamide to form an insoluble hydrophilic planographic surface.

By use of the term polyacrylamide, I intend to include within its scope the various equivalent derivatives thereof such as polymethacrylamide and also the variation equivalent copolymer systems.

Examples of copolymers which can be used according to this invention include copolymers of acrylamide and methacrylamide, acrylamide and methacrylic acid, and methacrylamide and methacrylic acid. The copolymers may be formed in various proportions so long as the methylolated copolymers can be cross-linked to form insoluble compositions having the proper hydrophilic-oleophilic balance. I have found that an advantageous copolymer is one consisting of 10 parts methacrylic acid and 90 parts acrylamide.

I have also found that polyacrylamide is a particularly advantageous homopolymer. Specific examples of polyacrylamide homopolymers that can be used designated by trade names are PAM 100, PAM 75, and PAM 50, all marketed by the American Cyanamid Company.

The polyacrylamide polymers and copolymers may be methylolated in various manners as is understood by those skilled in the art.

I have found that the degree of methylolation can be varied considerably and still produce the insoluble coatings having the proper hydrophilic-oleophilic balance. The methylolation can be carried out in an aqueous medium and can be varied by changing the formaldehyde-polyacrylamide ratio, the temperature, the pH, etc. Polyacrylamide methylolated to between about 35 to 85 percent can be used according to this invention. I have found, however, that if the polyacrylamide is methylolated to between about 70 to 80 percent the resulting methylolated polyacrylamides are more advantageous.

In methylolating the polyacrylamides, I have found that it is advantageous to disperse the polyacrylamide in water together with the methylolating agent formaldehyde, adjust the pH of the solution to about 10 with sodium carbonate, and heat this mixture for about 1½ hours at about 50° C. After the methylolation has been completed the pH is reduced from approximately 10 to about 6.7 for storage purposes. After this time the product can be cooled and the color mixed therewith. Under the above conditions, the degree of methylolation is between about 75–80 percent.

In forming the coating compositions of this invention, the methylolated polyacrylamide is mixed with the pigment together with a suitable catalyst. The methylolated polyacrylamide can be suitably dispersed with the pigment and catalyst or ball milled to obtain an even distribution.

The pH of the color thus prepared is then adjusted to between 5 and 7 with acetic acid and applied to the base surface desired by any suitable means. The applied coating composition is then heated to a sufficient temperature to effect a cross-linking of the methylolated polyacrylamide to form the insoluble hydrophilic-oleophilic coating.

Various pigments can be used to form the coating compositions and printing plates of this invention such as clay, zinc oxide, calcium carbonate, diatomaceous earth, fuller's earth, satin white, calcium silicate, barium sulfate, and titanium dioxide. Coating clays, and especially china clay, have been found to be particularly advantageous pigments. The use of clay as a pigment results in good all-around performance of the resulting planographic printing plate. The pigments may be used in a mixture if desired. An example of a combined pigment which can be used is a mixture of between about 70–80 percent by weight clay together with another filler such as satin white.

The pigment-adhesive ratio can be varied over a considerable range according to this invention. I have found that a pigment-adhesive ratio of about 4:1 is advantageous. Pigment-adhesive ratios as low as 2:1 and below can also be used as well as ratios as high as 6:1 and above to produce satisfactory planographic printing surfaces.

The cross-linking of the methylolated polyacrylamide is advantageously carried out in the presence of a suitable catalyst. Catalysts which can be used according to this invention include zinc acetate, zinc chromate, ammonium chloride, ammonium phosphate, zinc chloride, ammonium dichromate, and zinc borate. Other suitable catalysts can, of course, be used.

The amount of catalyst which can be used can be varied widely depending on the particular catalyst employed. The amount which is utilized can be readily determined by those skilled in the art. To illustrate the widely varying amounts of catalysts which can be used depending upon the catalyst, I have found that the resin-catalyst ratio where polyacrylamide is used as the resin can at least vary from about 10:1 to 1:2 based on dry weight. With zinc chromate I have found that the most advantageous resin-catalyst ratio is about 5:2 and with zinc acetate 1:2.

The conditions for effecting the cross-linking reaction of the polyacrylamide can be varied considerably depending upon the particular polyacrylamide homopolymer or copolymer being utilized, the pH of the coating composition, the amount and type of catalyst used, etc. as will be well understood by those skilled in the art. I have found that when utilizing methylolated polyacrylamide itself in a coating composition having a pigment-resin ratio of 4:1, 12 grams of zinc acetate and a pH of about 7, the methylolated polyacrylamide can be effectively cross-linked by heating the composition to a temperature of about 340° F. for about 50 seconds.

The following example illustrates a manner of producing the coating compositions and planographic printing plates of this invention in more detail.

*Example 1.*—10 grams of polyacrylamide marketed under the trade name PAM 100 by the American Cyanamid Company were mixed together with 200 grams of water and 11.5 cc. of a 37 percent formaldehyde solution. The pH of the solution was then adjusted to 10 with 20 percent sodium carbonate and the solution heated for 1½ hours at 50° C. At the end of this time a methylolated polyacrylamide was formed and the pH adjusted with acetic acid to about 6.7. The degree of methylolation was about 70–80 percent.

The methylolated polyacrylamide was allowed to cool and a coating color was formed by thoroughly dispersing 38 grams clay slip (63% solids) together with 120 grams of a 5% solids solution of the methylolated polyacrylamide as prepared above and 12 grams of zinc acetate. The pH of the coating color was then adjusted to between 5 and 6 with acetic acid.

The coating color was then applied onto a wet strength base paper stock and heated to about 340° F. for 50 seconds. The drying and cross-linking was accomplished at a machine speed of between about 160 and 200 feet per minute. The coating dried and formed an insoluble hydrophilic-oleophilic surface during the ordinary drying cycle for the paper. The coating was then suitable for receiving an image and for producing copies of that image by offset printing.

A greasy image was placed on the plate and copies of the image were produced by the offset printing process. The plate produced clean copy, exhibited good image and correction life and excellent toning and "stop-go" properties even after considerable use.

The plate properties can be adjusted and varied in a number of manners; for example, by modifying the amount and type of pigment, the particular polyacrylamide, the degree of methylolation of the particular polyacrylamide, and the catalyst.

I claim:

1. The method of making a planographic printing plate which comprises applying a planographic printing surface to a base by coating said base with an aqueous coating composition comprising a water soluble methylolated derivative of a water soluble polyacrylamide, said polyacrylamide being methylolated to between about 35 and 85 percent, a catalyst selected from the group consisting of zinc acetate, zinc chromate, zinc chloride, zinc borate, ammonium chloride, ammonium phosphate, and ammonium dichromate, and an inert inorganic pigment, and reacting the methylolated polyacrylamide with itself in the presence of the catalyst and pigment to form an insoluble planographic coating on said base surface.

2. The method of claim 1 in which the base surface is paper.

3. The method of claim 2 in which the pigment is clay.

4. A planographic printing plate comprising a base and a planographic printing surface thereon, said surface comprising an inert inorganic pigment and a water soluble methylolated derivative of a water soluble polyacrylamide insolubilized in the presence of said pigment by being reacted with itself, said polyacrylamide being methylolated to between about 35 and 85 percent.

5. The planographic printing plate of claim 4 in which the base surface is paper.

6. The planographic printing plate of claim 5 in which the pigment is clay.

References Cited in the file of this patent

UNITED STATES PATENTS

| | | |
|---|---|---|
| 2,616,818 | Azorlosa | Nov. 4, 1952 |
| 2,680,110 | Loughran et al. | June 1, 1954 |
| 2,724,665 | Oransky et al. | Nov. 22, 1955 |